UNITED STATES PATENT OFFICE.

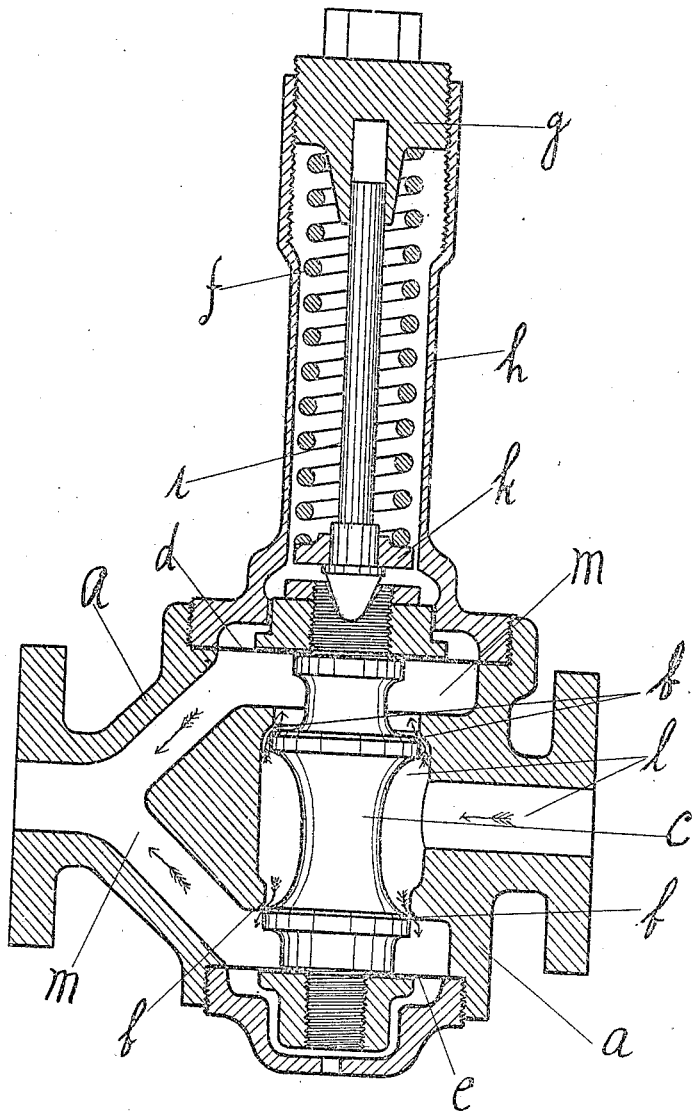

JEHU V. CHASE, OF NEWPORT, RHODE ISLAND.

PRESSURE REDUCING AND REGULATING VALVE.

952,416.  Specification of Letters Patent.  Patented Mar. 15, 1910.

Application filed November 29, 1907. Serial No. 404,442.

*To all whom it may concern:*

Be it known that I, JEHU V. CHASE, a citizen of the United States, residing at Newport, in the county of Newport, State of Rhode Island, have invented certain new and useful Improvements in Pressure Reducing and Regulating Valves, of which the following is a specification accompanied by a drawing.

This invention relates to valves which are employed to reduce the pressure of a fluid supplied from a source at high, and possibly varying pressure, and regulating its pressure so that the pressure of the same after leaving the valve will be approximately constant.

One object of the invention is to provide a valve of simple and compact construction which shall effectually reduce the pressure of the fluid passing through the valve.

Another object of the invention is to provide for efficient regulation and constancy of pressure at the low pressure or discharge side of the valve, notwithstanding considerable variation in pressure of the fluid at the high or inlet side thereof.

Other objects of the invention will hereinafter appear; and, to these ends, the invention consists of a pressure reducing and regulating valve for carrying out the above objects, embodying the features of construction, combination of elements and arrangement of parts having the general mode of operation substantially as hereinafter described and claimed in this specification, and shown in the accompanying drawing; which represents a vertical section of the valve body and some of the parts of the valve showing the operating parts thereof.

In the drawing—(*a*) represents the valve body having double seats (*b*).

(*c*) represents a valve carried by the elastic diaphragms (*d*) and (*e*).

(*f*) is a spring the compression of which may be adjusted by the threaded plug (*g*) which screws into the end of the spring casing (*h*).

(*i*) is a guide rod, and (*k*) a collar causing the spring to press centrally upon the spindle of the valve (*c*).

(*l*) represents the high pressure or inlet spaces of the valve, and (*m*) the low pressure or discharge spaces.

The fluid passes through the valve in the direction indicated by the arrows. The flexibility of the diaphragms (*d*) and (*e*) to which the valve (*c*) is attached permits some movement of the valve, so that it may be made to approach or recede from the double seats (*b*) of the valve body. As these seats and the corresponding portions of the valve are of the same diameter, the pressures on the valve are equal and opposite, and balance one another. The diaphragms (*d*) and (*e*) are exposed on one side to the pressure of the fluid in the lower pressure spaces (*m*) of the valve, and on the other side to the constant atmospheric pressure. The area of the diaphragm (*d*) exposed to the pressure in the spaces (*m*) is greater than the area of the diaphragm (*e*) so exposed. The pressure in the spaces (*m*) will depend upon the area open to the passage of the fluid between the valve plug (*c*) and the double seats (*b*) of the valve body. A reduction of this area will cause a lowering of the pressure in the spaces (*m*); and, conversely, an increase therein will cause a rise in the pressure in the spaces (*m*). The pressure of the fluid in the spaces (*m*) upon the diaphragms (*d*) and (*e*) tends to deflect these diaphragms in opposite directions, but since the area of the diaphragm (*d*) exposed to the pressure of the fluid is greater than is the area of the diaphragm (*e*) so exposed, the resultant pressure on the two diaphragms tends to force the valve plug (*c*) upon the double seat (*b*) and so close the valve to the discharge of fluid. If, however, the compression of the spring (*f*) is suitably adjusted, the valve (*c*) may be made to leave between it and the double seats (*b*) such an area that the pressure in the spaces (*m*) of the discharge side of the valve will be a desired pressure. The pressure then exerted by the spring (*f*) upon the valve (*c*) and hence upon the diaphragm (*d*) will equal the difference between the pressure of the fluid in the spaces (*m*) upon the two diaphragms due to their difference in area. The spring (*f*) is constructed so that the slight changes in its length, which will be produced in the operation of the valve, will not sensibly alter the pressure exerted by it. If, then, after such adjustment of the spring (*f*) has been made, the pressure in the spaces (*m*) rise above the pressure for which adjustment was made, the excess of pressure upon the diaphragm (*d*) will cause the valve (*c*) to approach the double seats (*b*) and reduce the pressure in the spaces (*m*). Conversely, a fall in the pressure in the spaces (*m*) will destroy the balance of forces acting upon the valve (*c*) and the spring (*f*) will cause the valve to recede from the double seats (*b*), and so increase the area of the openings through the valve and thereby increase the pressure in the spaces (*m*). In this way the pressure in the space *m* is kept approximately constant.

The range within which the pressure in the spaces (*m*) is to vary for any setting of the valve will depend upon the ratio of the areas of the diaphragms (*d*) and (*e*) exposed to the pressure of the fluid in the spaces (*m*) and upon the diameters of the valve seats. Accurate regulation of this pressure at the discharge side of the valve may be provided for by suitably proportioning the areas of the diaphragms (*d*) and (*e*) and the diameters of the double seats (*b*). The sensitiveness of a spring varies with the force which the spring is designed to exert and a spring designed to exert great force will change its length less for a small change in pressure upon it than will a spring designed to exert a smaller force. To secure accurate regulation of pressure in a spring-loaded pressure reducing valve it is necessary that small changes in pressure shall produce sufficient movement of the valve to modify the discharge pressure. In reducing valves as heretofore constructed the whole pressure upon the control diaphragm is balanced by a spring; and, since it is necessary to employ a diaphragm of considerable size in order to permit sufficiently large movement of the valve, a heavy spring of low sensitiveness has of necessity to be employed. By employing two diaphragms the pressure upon which produces forces tending to move the valve in opposite directions, I provide for considerable movement in the valve and am enabled to use a spring of greatly increased sensitiveness, since the spring may be designed to overcome only the relatively small unbalanced force exerted through the diaphragm upon the valve. A valve constructed in accordance with my invention will therefore be much more sensitive to changes in pressure at the discharge side than is the case with valves as now ordinarily constructed. Since the pressure exerted upon the valve (*c*) at the high pressure side balance one another and the control of the valve is affected entirely through the pressure exerted upon the diaphragms by the fluid in the spaces (*m*) at the discharge side of the valve, wide ranges in pressure in the spaces (*l*) will be without sensible effect upon the pressure maintained in the spaces (*m*) if the diameters of the valve seats (*b*) and the diaphragm areas are suitably proportioned.

In this manner it is possible to construct a valve of great simplicity which will effectually reduce and control the pressure of a fluid supplied from a source of fluid at high pressure even over so wide a range in high pressure as is the case in automobile torpedoes wherein the pressure varies during running from a very high pressure in the air storage reservoir at starting to a low pressure at the end of the run of the torpedo.

Obviously the invention may be embodied in widely varying forms.

Therefore, without limiting the invention to the construction shown or described, or enumerating equivalents, I claim and desire to secure, by Letters Patent, the following:—

1. The combination in a pressure reducer and regulator of a valve body, a pressure control valve within said body actuated by two opposing diaphragms of small difference in area both exposed at one side thereof to the outlet pressure of the fluid acted upon by said valve and at the other sides thereof to a constant pressure, and a sensitive spring constructed to overcome the resultant pressure upon said opposing diaphragms, substantially as described.

2. A pressure reducer and regulator having a body with an inlet, an outlet and a valve seat, a movable valve adapted to close upon said valve seat, two diaphragms one of which is slightly greater in area than the other secured to said valve body and on said movable valve in such manner as to expose one of the sides of each of said diaphragms to the outlet pressure of the fluid passing through said reducing valve and the other side of each thereof to the pressure of the atmosphere, and a spring adapted to bear upon said movable valve to counteract the unbalanced pressure exerted by said diaphragms thereon, substantially as and for the purposes described.

3. A pressure reducer and regulator comprising a valve body having double seats of approximately equal areas, a movable balanced valve adapted to seat upon the seats of said valve body, two diaphragms of unequal area secured to said valve body and exposed at one side of each thereof to the pressure of the fluid at the discharge side of said valve and at each of the other sides thereof to the pressure of the atmosphere and secured to said valve in such manner as to transmit through said fluid pressure forces in opposite directions to said valve, a spring adapted to bear upon said valve and constructed to counteract the relatively small unbalanced residue of the forces transmitted to said valve by said diaphragms, and means whereby the force exerted by said spring upon said valve may be adjusted, substantially as and for the purposes described.

4. A pressure reducer and regulator, including, in combination two opposing diaphragms of relatively small difference in area, both exposed at one side thereof to the outlet pressure of the fluid acted upon by said valve and at the other side thereof to a constant lower pressure and a spring arranged to counterbalance the difference in opposing pressures upon said diaphragms, substantially as described.

5. A pressure reducer and regulator, including, in combination with a movable balanced valve, two diaphragms of slightly unequal area each exposed at one side to the pressure of the fluid at the discharge side of said valve and at the other sides thereof to the pressure of the atmosphere, constructed to exert forces in opposite directions upon said movable valve, a spring adapted to exert pressure upon said movable valve to counterbalance the unbalanced portion of the forces exerted by said diaphragms thereon, and means whereby the pressure exerted by said spring may be adjusted, substantially as described.

6. A pressure reducer and regulator, including, in combination with a movable valve, a spring adapted to exert pressure upon said movable valve and two diaphragms of a relatively small difference in area, each exposed at one side thereof to the pressure of the fluid at the discharge side of said valve, connected to and arranged to operate said movable valve by the resultant of the opposing pressures of the fluid at the discharge side of said valve upon said diaphragms, substantially as described.

In testimony whereof I have signed this specification in the presence of subscribing witnesses.

JEHU V. CHASE.

Witnesses:
 CHAS. H. DOUGHERTY,
 R. HASBROUCK,
 R. H. DUNLOP.